United States Patent [19]

Layer et al.

[11] 3,747,873

[45] July 24, 1973

[54] TOW CABLE ASSEMBLY

[75] Inventors: Gerard E. Layer, Newport Beach; John S. Yates, Placentia; John A. Kreuzer, Mission Viejo, all of Calif.

[73] Assignee: The Susquehanna Corporation, Fairfax County, Va.

[22] Filed: Nov. 19, 1971

[21] Appl. No.: 200,315

[52] U.S. Cl. ............ 244/3, 244/1 TD, 244/135 A, 258/1.2, 273/105.3, 343/707
[51] Int. Cl. .............................................. B64d 3/00
[58] Field of Search ................ 244/3, 135 A, 1 TD, 244/113, 110 D, 110 G; 273/105.3; 343/707, 18 B, 18 C; 258/1.2, 1.4

[56] References Cited
UNITED STATES PATENTS

| | | | |
|---|---|---|---|
| 2,460,194 | 1/1949 | Schultz | 273/105.3 |
| 2,960,295 | 11/1960 | Schulze | 244/135 A |
| 1,867,902 | 7/1932 | Weaver | 244/135 A |
| 1,818,334 | 8/1931 | Zimmerman | 244/135 A |
| 1,858,336 | 5/1932 | Mirick | 244/1 TD |

Primary Examiner—Milton Buchler
Assistant Examiner—Galen L. Barefoot
Attorney—Tipton D. Jennings

[57] ABSTRACT

A tow cable assembly for an aircraft wherein a stand-off distance between the tow cable and the tail pipe is accomplished by a spacer member attached to a tube. A tow cable reel assembly is attached to the underside of the aircraft, and the tube is attached directly to the aft end of the reel assembly by a movable coupling. The tube shrouds the tow cable for the distance aft of the reel assembly and just forward of the jet tail pipe of the aircraft. The movable coupling attachment between the tube and the reel assembly allows the tube to rotate in horizontal and vertical planes and to follow the flight path of the tow cable. When the tow aircraft maneuvers in such a manner that the tube and tow cable are moved toward the tail pipe of the aircraft, the spacer member mounted on the tube engages the underside of the aircraft, just forward of the tail pipe, and provides a bridge between the tow cable and the tail pipe. In this manner, the tow cable is prevented from direct contact with the heated tail pipe.

9 Claims, 2 Drawing Figures

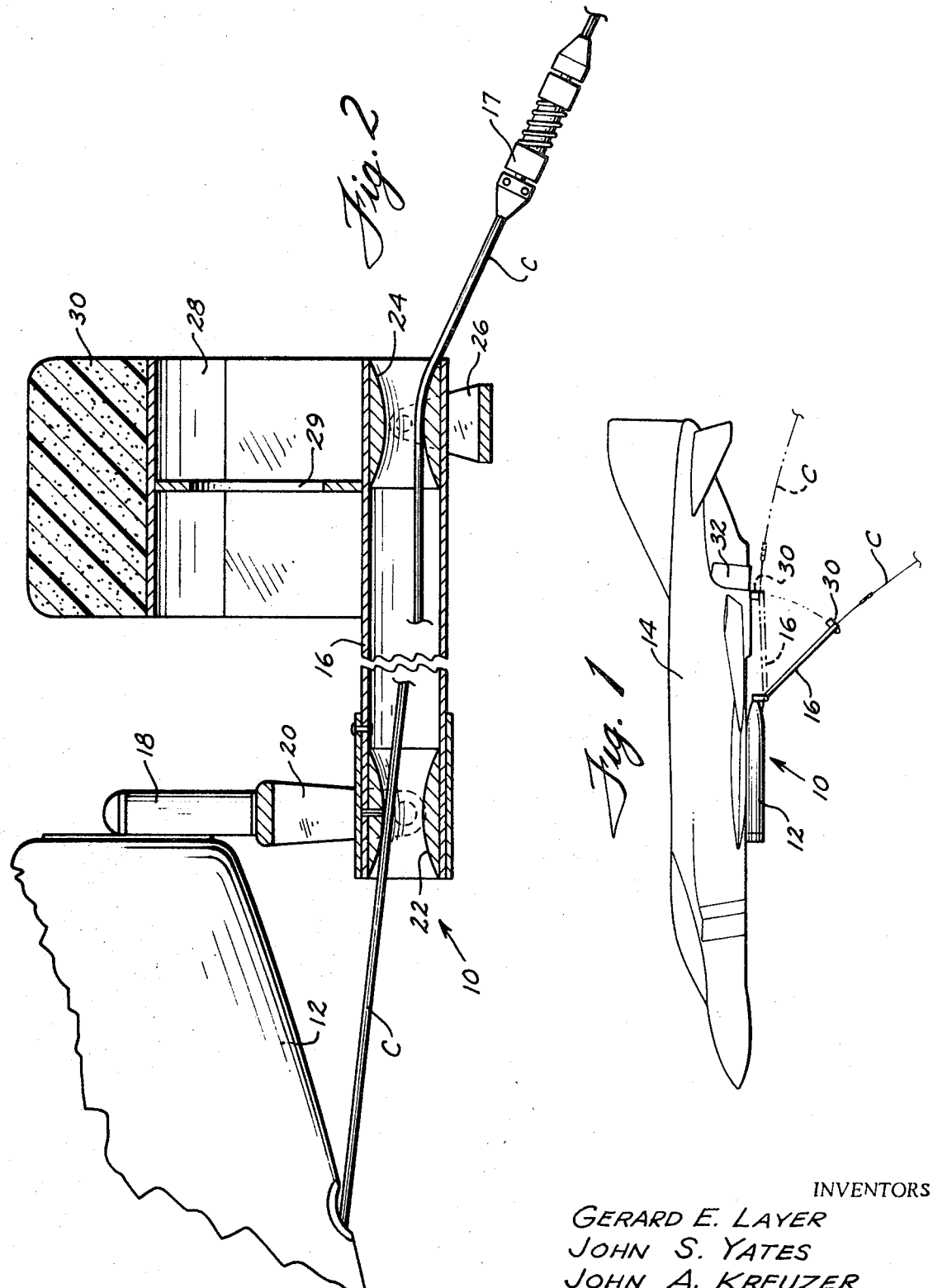

TOW CABLE ASSEMBLY

BACKGROUND OF THE INVENTION

The present invention relates to a tow cable assembly for an aircraft and, more particularly, to a tow cable assembly wherein the tow cable is prevented from directly contacting the tail pipe of the aircraft during various maneuvers of the aircraft.

Targets towed by jet aircraft or the like that employ an on-center line tow reel are limited in their maneuvers owing to tow cable-tail pipe impingement. This impingement has resulted in excessive heating of the tow cable and subsequent weakening or failure of the cable. During flight, the tow cable flies in a parabolic shape independent of the tow aircraft's attitude, and the tow cable's center of rotation with respect to the tow aircraft is at the tow reel assembly, which, for example, may be located approximately nine feet forward of the jet tail pipe. When the tow aircraft maneuvers, it rotates about the tow cable's center of rotation, thereby permitting the hot jet tail pipe to contact and damage the tow cable. If afterburners are used during maneuvers, the problem of heating the tow cable is even further magnified.

Accordingly, a need has arisen for a tow cable assembly which will prevent contact between the tow cable and the jet tail pipe during various types of maneuvers of a jet aircraft. The tow cable assemblies in use in the past and at the present time have failed to fulfill this need.

SUMMARY OF THE INVENTION

The objects and advantages of the invention will be set forth in part in the description which follows, and in part will be obvious from the description, or may be learned by practice of the invention. The objects and advantages of the invention may be realized and attained by means of the instrumentalities and the combinations particularly pointed out in the appended claims.

The tow cable assembly of the present invention is so constructed that the tow cable is prevented from contacting the jet tail pipe of the aircraft during various types of maneuvers of the aircraft. The tow cable assembly comprises a tow cable reel assembly secured to the underside of the aircraft, and a tube attached to the aft end of the reel assembly by a movable coupling that allows the tube to pivot or rotate relative to the reel in horizontal and vertical planes. The tow cable extends from the reel assembly through the tube, and thus the tube serves to shroud the tow cable for the distance aft of the reel and just forward of the jet tail pipe of the aircraft. A cushioned spacer member is attached to the upper surface of the tube at the aft end thereof. When the tow aircraft performs certain types of maneuvers which cause the jet tail pipe to be moved toward the tow cable, the cushioned spacer member contacts the underside of the aircraft, just forward of the tail pipe, and provides a bridge between the tow cable and the tail pipe, thereby preventing engagement of the tow cable with the heated tail pipe.

Inside of the tube of the tow cable assembly, there are provided inlet and outlet cable guides that reduce frictional drag during the reeling operation of the tow cable and serve to effect the tow cable assembly's response to cable movement. To accommodate aircraft takeoff and landing, a skid or caster is attached to the underside of the tube for runway contact.

To achieve the objects and in accordance with the purpose of the invention, as embodied and broadly described herein, the tow cable assembly of this invention comprises a tow cable reel assembly adapted to be secured to the underside of the aircraft forward of the tail pipe, a tubular member extending longitudinally of the aircraft and being adapted to receive therethrough the tow cable from said reel assembly, said tubular member being movably connected at its forward end to the rear portion of said reel assembly such that it is movable away from the aircraft in at least one plane, and a spacer member mounted on the upper portion of said tubular member and movable therewith, said spacer member being adapted to engage the underside of the aircraft during certain maneuvers thereof to prevent contact of the tubular member with the underside of the aircraft and to prevent contact of the tow cable with the tail pipe.

The invention consists in the novel parts, constructions, arrangements, combinations and improvements shown and described. The accompanying drawings, which are incorporated in and constitute a part of the specification, illustrate one embodiment of the invention, and, together with the description, serve to explain the principles of the invention.

BRIEF DESCRIPTION OF THE DRAWING

FIG. 1 is a side elevational view of the tow cable assembly of the present invention mounted on the underside of a jet aircraft; and FIG. 2 is an enlarged side elevational view, with parts broken away and parts in section, of a portion of the tow cable assembly of the present invention

DESCRIPTION OF THE PREFERRED EMBODIMENT

Reference will now be made in detail to the present preferred embodiment of the invention, an example of which is illustrated in the accompanying drawings.

As shown in FIG. 1 and in accordance with the invention, the tow cable assembly 10 of the present invention generally comprises a tow cable reel assembly 12 of any suitable construction adapted to be secured in any suitable manner to the underside of an aircraft such as a jet aircraft 14, and a tubular member 16 that is movably secured at its forward end to the rear portion of the reel assembly 12. The tubular member normally extends longitudinally of the aircraft. The tow cable C extends from the reel assembly 12 through the tubular member 16 and is secured to the aircraft or target (not shown) being towed by the aircraft 14. The cable C may be provided with any suitable type of guide or stop member 17 (FIG. 2).

Referring now to FIG. 2, a bracket 18 of any suitable construction is secured to the aft end of the reel assembly 12, and a coupling member 20 of any suitable construction is secured to the lower end of the bracket 18. The forward end of the tubular member 16 is secured to the coupling 20 in any suitable manner such that the tubular member is rotatable or pivotable relative to the coupling 20 in both horizontal and vertical planes. As an illustrative example, the tubular member 16 may be connected to the coupling 20 through a joint such as a universal joint (not shown) that would enable the tubular member 16 to be pivotally movable in a universal manner. Alternatively as shown, coupling member 20 can rotate in bracket 18 in the horizontal or yaw plane; and tubular member 16 can pivot about coupling member 20 in the vertical or elevation plane. As a result, the tubular member 16 can be moved about two axes.

The tubular member 16 is provided with inlet and outlet, annular cable guides 22 and 24, respectively. Each of the cable guides, 22, 24, is provided with a curved inner surface for the purpose of reducing frictional drag between the tubular member and the cable C during the reeling of this cable. At its aft end, the tubular member 16 supports a skid member 26 which serves to contact the runway during takeoff and landing of the aircraft. Alternatively, a caster or wheel (not shown) may be substituted for the skid member 26 for runway contact. The skid 26 or caster may be of any suitable construction within the scope of the present invention.

An upwardly and outwardly tapered support bracket 28 of any suitable construction is secured to the upper surface of the tubular member 16 adjacent the aft end thereof and therefore moves with the tubular member. The bracket 28 may be provided with an aperture 29 for the purpose of reducing its weight and reducing drag. Mounted on the outer or upper end of the support bracket 28 is a flexible and resilient spacer member 30 which may be of any suitable material and construction. As an illustrative example, the spacer member 30 may be formed of Neoprene sponge or may be inflatable.

In the operation of the present tow cable apparatus, during normal flight of the aircraft 14 as shown in FIG. 1, the tubular member 16 moves away from the aircraft and extends downwardly from the reel assembly 12, and the tow cable C is spaced a substantial distance from the tail pipe 32 of the aircraft 14. During such flight, there is little possibility of damage to the tow line C owing to the heat generated in the tail pipe 32.

During certain types of maneuvers by the aircraft 14, however, the tubular member 16 is pivoted upwardly toward the underside of the aircraft, as shown in broken lines in FIG. 1. When the tubular member 16 moves upwardly toward the underside of the aircraft, the spacer member 30 engages the under surface of the aircraft just forward of the tail pipe 32 to maintain the tubular member 16 in spaced relation to the under surface of the aircraft. This spacing of the tubular member 16 from the aircraft serves to prevent contact of the tow cable C with the jet tail pipe 32, thereby effectively preventing damage to the tow cable as a result of heat from the tail pipe.

What is claimed is:
1. A tow cable assembly for an aircraft having a tail pipe, comprising:
 a tow cable reel assembly adapted to be secured to the underside of the aircraft forward of the tail pipe,
 a tubular member extending longitudinally of the aircraft and being adapted to receive therethrough the tow cable from said reel assembly,
 said tubular member being movably connected at its forward end to the rear portion of said reel assembly such that it is movable away from the aircraft in at least one plane, and
 a spacer member mounted on the upper portion of said tubular member and movable therewith, said spacer member being adapted to engage the underside of the aircraft during certain maneuvers thereof to prevent contact of the tubular member with the underside of the aircraft and to prevent contact of the tow cable with the tail pipe.
2. The tow cable assembly of claim 1 wherein said tubular member is pivotally connected to said reel assembly.
3. The tow cable assembly of claim 1 further comprising internal cable guides within said tubular member to reduce frictional drag between the tow cable and said tubular member.
4. The tow cable assembly of claim 1 further comprising a support bracket mounted on the upper portion of the rear end of said tubular member, said spacer member being mounted on said support bracket.
5. The tow cable assembly of claim 4 wherein said spacer member is flexible and resilient.
6. The tow cable assembly of claim 1 wherein said spacer member is flexible and resilient.
7. The tow cable assembly of claim 1 further comprising a skid member on the bottom portion of said tubular member for runway contact during takeoff and landing of the aircraft.
8. The tow cable assembly of claim 2, further comprising a coupling member to which the forward end of said tubular member is pivotally connected, said coupling member being connected to the rear portion of said reel assembly.
9. The tow cable assembly of claim 5, further comprising a coupling member to which the forward end of said tubular member is pivotally connected, said coupling member being connected to the rear portion of said reel assembly.

* * * * *

UNITED STATES PATENT OFFICE
CERTIFICATE OF CORRECTION

Patent No. 3,747,873            Dated July 24, 1973

Inventor(s) Gerard E. Layer, John S. Yates, and John A. Kreuzer

It is certified that error appears in the above-identified patent and that said Letters Patent are hereby corrected as shown below:

On the first page of the patent, after "Assignee:", delete "The Susquehanna Corporation, Fairfax County, Va." and insert - - Celesco Industries Inc., Costa Mesa, California - -

Signed and sealed this 27th day of November 1973.

(SEAL)
Attest:

EDWARD M. FLETCHER, JR.           RENE D. TEGTMEYER
Attesting Officer                  Acting Commissioner of Patents